United States Patent
Tanimura et al.

(10) Patent No.: US 8,768,173 B2
(45) Date of Patent: Jul. 1, 2014

(54) OPTICAL RECEIVER AND OPTICAL TRANSMISSION SYSTEM

(75) Inventors: Takahito Tanimura, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 13/324,639

(22) Filed: Dec. 13, 2011

(65) Prior Publication Data
US 2012/0177383 A1 Jul. 12, 2012

(30) Foreign Application Priority Data
Jan. 7, 2011 (JP) ................................ 2011-001649

(51) Int. Cl.
H04B 10/06 (2006.01)
H04B 10/00 (2013.01)
H04L 27/00 (2006.01)

(52) U.S. Cl.
USPC ........... 398/158; 398/208; 398/140; 398/202; 398/204; 370/342; 370/343; 370/276; 370/277

(58) Field of Classification Search
CPC ....... H04J 14/02; H04B 10/61; H04B 10/616; H04B 10/6164; H04B 10/6165
USPC .......................... 398/158, 208, 140, 202, 204
See application file for complete search history.

(56) References Cited

U.S. PATENT DOCUMENTS

| 8,103,176 B2 | 1/2012 | Li et al. | |
|---|---|---|---|
| 8,335,438 B2 * | 12/2012 | Kim et al. | 398/154 |
| 8,346,091 B2 * | 1/2013 | Kummetz et al. | 398/115 |
| 2005/0180760 A1 * | 8/2005 | Feced et al. | 398/183 |
| 2007/0133993 A1 * | 6/2007 | Yee et al. | 398/85 |
| 2009/0047030 A1 | 2/2009 | Hoshida | |
| 2009/0052556 A1 * | 2/2009 | Fernandez | 375/241 |
| 2009/0080906 A1 * | 3/2009 | Tao et al. | 398/209 |

(Continued)

FOREIGN PATENT DOCUMENTS

| JP | 9-252283 | 9/1997 |
|---|---|---|
| JP | 2009-021887 | 1/2009 |
| JP | 2009-049613 | 3/2009 |
| JP | 2010-041210 | 2/2010 |

OTHER PUBLICATIONS

M. Matsui, et al., "A Prototype of Band-divided Receiver for Optical Wideband Signal," 15th Opto Electronics and Communications Conference (Jul. 5, 2010), pp. 154-155.

(Continued)

Primary Examiner — Oommen Jacob
(74) Attorney, Agent, or Firm — Fujitsu Patent Center

(57) ABSTRACT

An optical receiver includes: a first generator to generate, from an optical signal to which a reference signal is inserted, a first digital signal representing a signal component of a first partial band including the reference signal, using a first local oscillation light of a first frequency; a second generator to generate, from the optical signal, a second digital signal representing a signal component of a second partial band including the reference signal, using a second local oscillation light of a second frequency being different from the first frequency; a frequency compensator to adjust a frequency of the signal component of the first partial band and a frequency of the signal component of the second partial band according to a frequency of the reference signal; and a combiner to combine the first and second partial bands adjusted by the frequency compensator.

18 Claims, 14 Drawing Sheets

(56) References Cited

U.S. PATENT DOCUMENTS

| | | | |
|---|---|---|---|
| 2009/0129787 A1* | 5/2009 | Li et al. | 398/208 |
| 2009/0141831 A1* | 6/2009 | Tao et al. | 375/325 |
| 2009/0142076 A1* | 6/2009 | Li et al. | 398/208 |
| 2009/0245815 A1* | 10/2009 | Zhang et al. | 398/208 |
| 2010/0091688 A1* | 4/2010 | Staszewski et al. | 370/277 |
| 2010/0104284 A1* | 4/2010 | Liu et al. | 398/65 |
| 2010/0142971 A1* | 6/2010 | Chang et al. | 398/154 |
| 2010/0178057 A1* | 7/2010 | Shieh | 398/79 |
| 2010/0310256 A1* | 12/2010 | Shpantzer et al. | 398/74 |
| 2011/0103529 A1* | 5/2011 | Kim et al. | 375/344 |
| 2011/0150478 A1* | 6/2011 | Winzer | 398/65 |
| 2011/0222854 A1* | 9/2011 | Roberts et al. | 398/70 |
| 2012/0076507 A1* | 3/2012 | Roberts et al. | 398/205 |
| 2012/0087668 A1* | 4/2012 | Li et al. | 398/79 |
| 2012/0141135 A1* | 6/2012 | Yang et al. | 398/140 |
| 2012/0177383 A1* | 7/2012 | Tanimura et al. | 398/158 |
| 2012/0263163 A1* | 10/2012 | Burzigotti et al. | 370/344 |

OTHER PUBLICATIONS

"Extended European Search Report" (EESR) mailed by EPO and corresponding to European application No. 11193489.9 on Apr. 23, 2012.

Andrew, Viterbi J. et al., "Nonlinear Estimation of PSK-Modulated Carrier Phase with Application to Burst Digital Transmission", IEEE Transactions on Information Theory, vol. IT-29, No. 4, Jul. 1983, pp. 543-551.

Lei, Li et al., "Wide-range, Accurate and Simple Digital Frequency Offset Compensator for Optical Coherent Receivers", OFC 2008, OWT4, 2008.

* cited by examiner

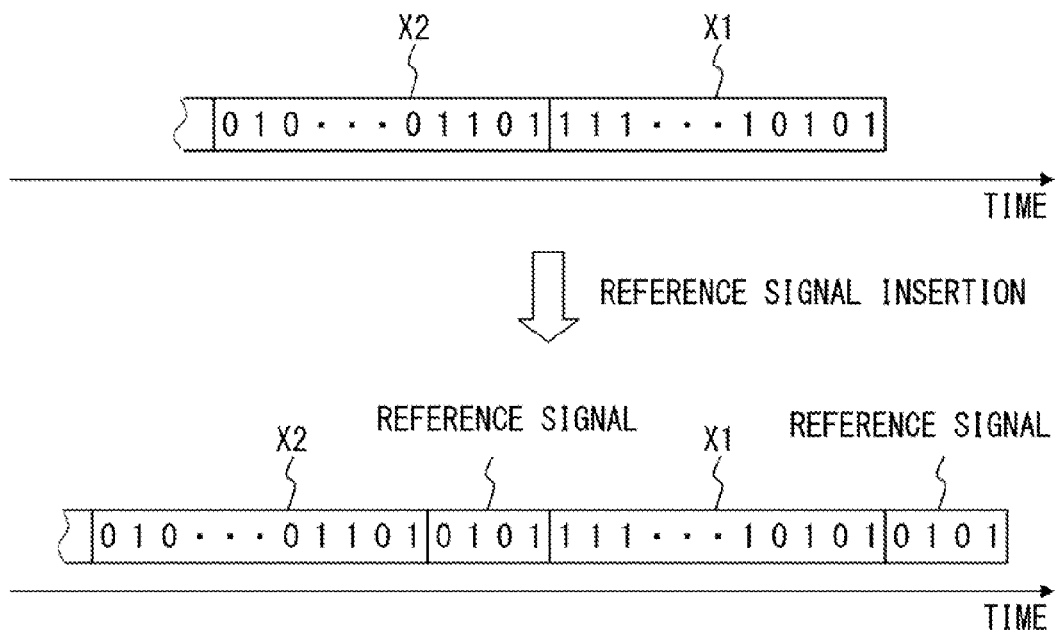
F I G. 4

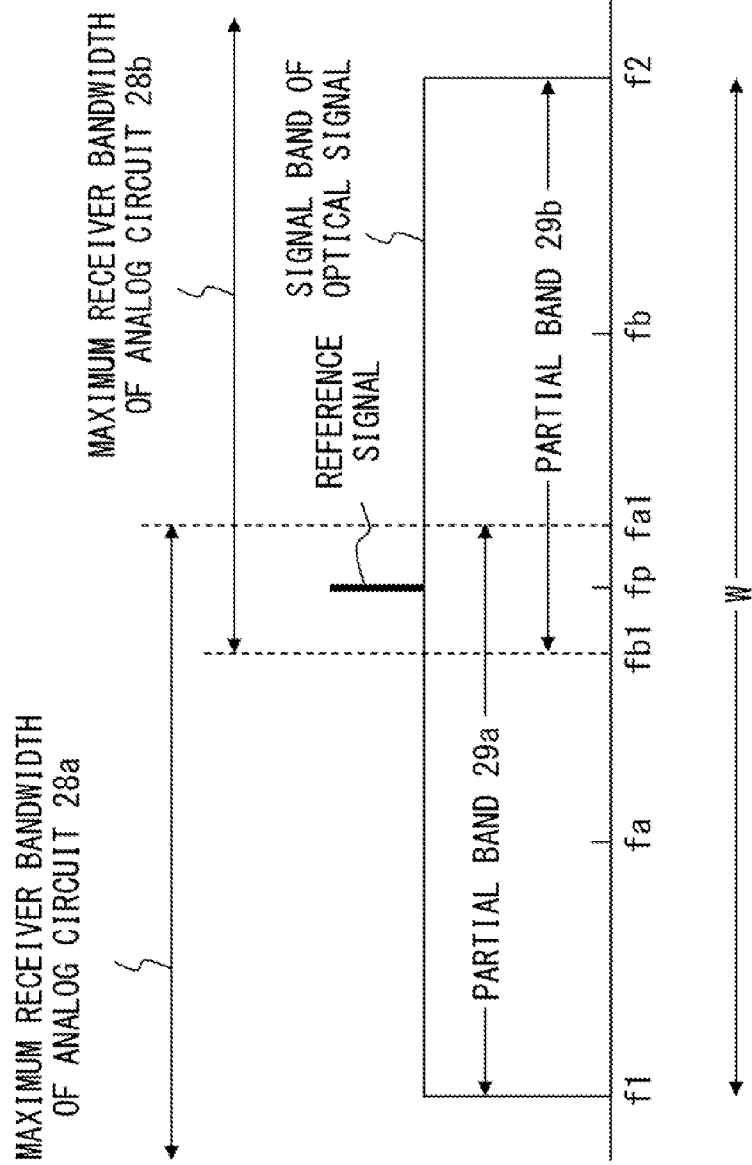
F I G. 7

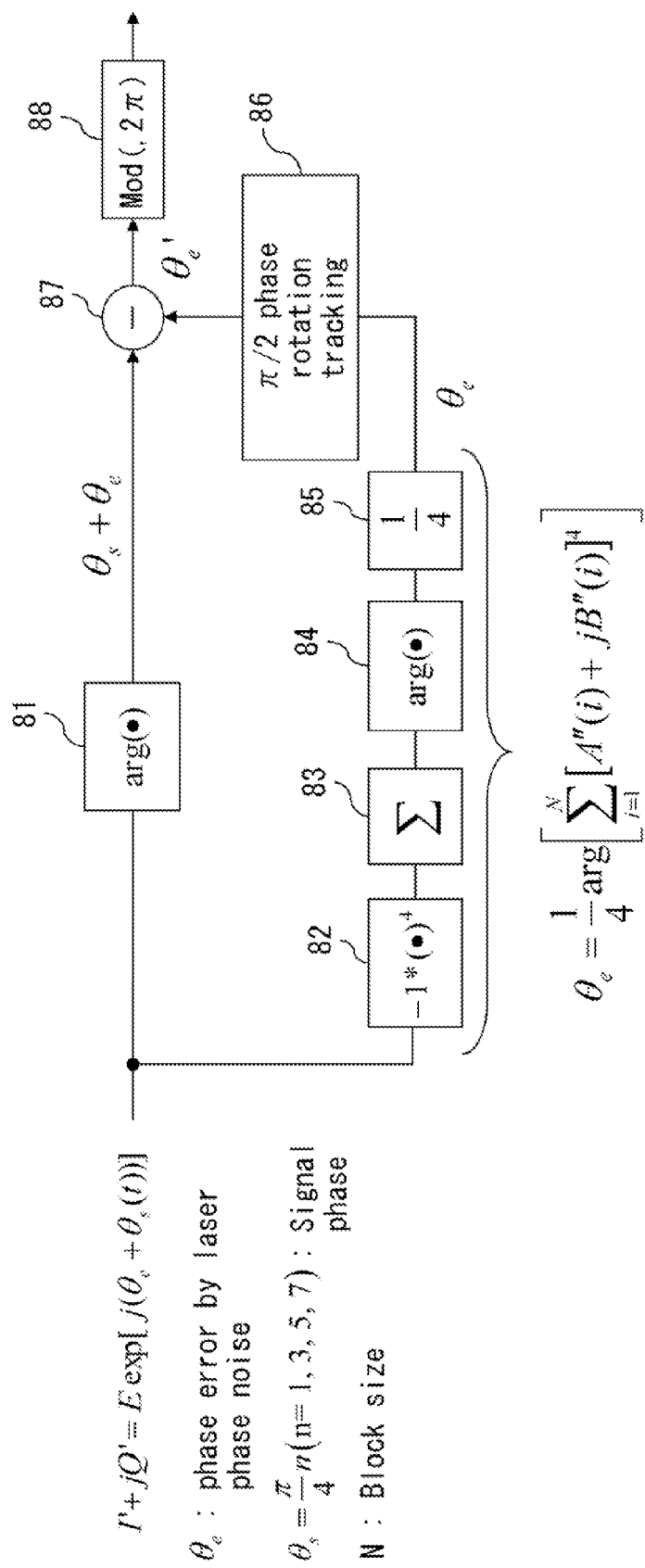
F I G. 1 2

OPTICAL RECEIVER AND OPTICAL TRANSMISSION SYSTEM

CROSS-REFERENCE TO RELATED APPLICATION

This application is based upon and claims the benefit of priority of the prior Japanese Patent Application No. 2011-001649, filed on Jan. 7, 2011, the entire contents of which are incorporated herein by reference.

FIELD

The embodiments described in this application are related to an optical receiver, a method for receiving an optical signal, and an optical transmission system.

BACKGROUND

The next-generation optical communication requires transmission of terabit data. As the speed of optical communication increases, studies and development of an optical receiver that receives an optical signal using digital signal processing have been conducted.

FIG. 1 illustrates an example of an optical receiver that receives an optical signal using digital signal processing. In FIG. 1, an optical signal transmitted through an optical transmission link is input to an optical hybrid circuit. The optical hybrid circuit obtains the I component and Q component of the optical signal by mixing local oscillation light and the optical signal. A photo detector circuit converts the I component optical signal and the Q component optical signal obtained by the optical hybrid signal respectively into an electric signal. An A/D converter converts the signals output from the photo detector into digital signals, respectively. Then, the digital signal processor recovers transmission data from the digital signals.

The digital signal processor may provide a function to compensate for the difference between the frequency of the signal light and the frequency of the local oscillation light (that is, the offset frequency), and a function to compensate for the carrier phase. In addition, the digital signal processor may also provide a function to compensate for characteristics of the optical transmission link (for example, chromatic dispersion).

As a related art, a coherent optical receiver having a mixer, O/E converter, received data processor, modulator described below has been proposed. The mixer mixes local oscillation light and received signal light. The O/E converter performs O/E conversion for the light of the mixed signal mixed in the mixer. The received data processor performs a process to obtain received data included in the received signal light through a digital signal process for the mixed signal converted into an electric signal in the O/E converter based on the first clock. The modulator modulates the local oscillation light or the received signal light using a clock with a phase synchronized with that of the first clock used for the digital signal processing in the received data processor (for example, Japanese Laid-open Patent Publication No. 2009-49613). In addition, Japanese Laid-open Patent Publication No. 2010-41210, Japanese Laid-open Patent Publication No. 2009-21887, and Japanese Laid-open Patent Publication No. 09-252283 describe other related arts.

In the transmission of super high-speed data, the signal band of the optical signal may be extended into, for example, several hundred GHz or more per wavelength. However, in the optical receiver illustrated in FIG. 1, the band of the analog receiver circuits (such as the photo detector circuit and the A/D converter) is, for example, about several dozen GHz, and it is difficult to receive the broadband optical signal as mentioned above.

In order to solve this problem, for example, a configuration in which the signal band of an input optical signal is divided into a plurality of partial bands using an optical circuit, and a plurality of analog receiver circuits respectively receive the signal in the corresponding partial band may be considered. However, in this configuration, a plurality of local oscillators to obtain the plurality of partial bands need to be synchronized. In this case, it is preferable that the phases of the plurality of local oscillation light are synchronized with each other. However, since an optical circuit that generates a plurality of local oscillator light synchronized with each other has a complicated configuration and a large circuit size, it is difficult to be implemented in the optical receiver.

SUMMARY

According to an aspect of the invention, an optical receiver includes: a first generator to generate, from an optical signal to which a reference signal is inserted, a first digital signal representing a signal component of a first partial band including the reference signal, using a first local oscillation light of a first frequency; a second generator to generate, from the optical signal, a second digital signal representing a signal component of a second partial band including the reference signal, using a second local oscillation light of a second frequency being different from the first frequency; a frequency compensator to adjust a frequency of the signal component of the first partial band and a frequency of the signal component of the second partial band according to a frequency of the reference signal; and a combiner to combine the first and second partial bands adjusted by the frequency compensator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating insertion of a reference signal.

FIG. 7 is a diagram illustrating the allocation of the reference signal and local oscillation light, and generation of a partial band.

FIG. 12 illustrates an example of a carrier phase estimator.

DESCRIPTION OF EMBODIMENTS

Figure 1:
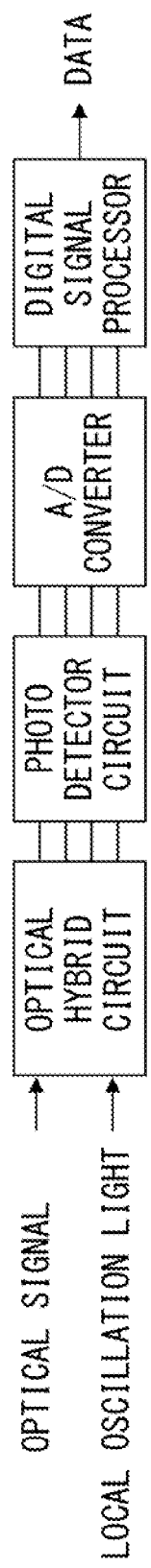
FIG. 1 illustrates an example of an optical receiver that receives an optical signal using digital signal processing.
Figure 2:
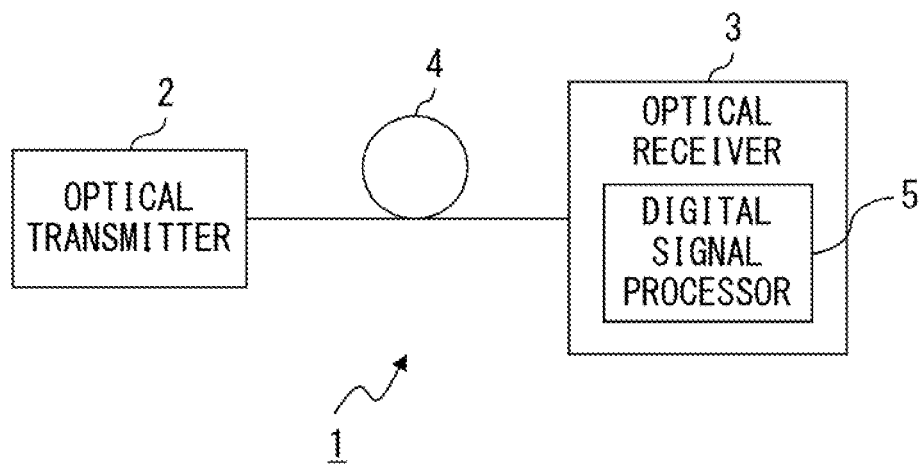
FIG. 2 illustrates an optical transmission system of the embodiment.

FIG. 2 illustrates the optical transmission system of the embodiment. An optical transmission system 1 of the embodiment has an optical transmitter 2 and an optical receiver 3. The optical transmitter 2 generates an optical signal to transmit data. The optical signal generated by the optical transmitter 2 is transmitted through an optical transmission link 4. On the optical transmission link 4, one or more relay stations (or optical amplifiers) may be provided. The optical receiver 3 receives the optical signal transmitted through the optical transmission link 4. The optical transmitter 3 has a digital signal processor 5 that recovers data from the received optical signal.

The digital signal processor 5 is realized by, while there is no particular limitation, for example, using a processor and a memory. In addition, the digital signal processor 5 may be realized by other methods. For example, the digital signal processor 5 may be realized by using an FPGA (Field Programmable Gate Array) or a dedicated LSI. Alternatively, the digital signal processor 5 may be realized by a general purpose processor.

The optical transmission system may transmit a WDM optical signal, or may transmit an optical signal using only one wavelength. In addition, the optical transmission system 1 may transmit a polarization multiplexed optical signal, or may transmit a single-polarization optical signal. Furthermore, the optical system 1 may transmit data using a plurality of carriers (or subcarriers) of different frequencies for each wavelength. That is, the optical system 1 may transmit a multicarrier optical signal.

Figure 3:
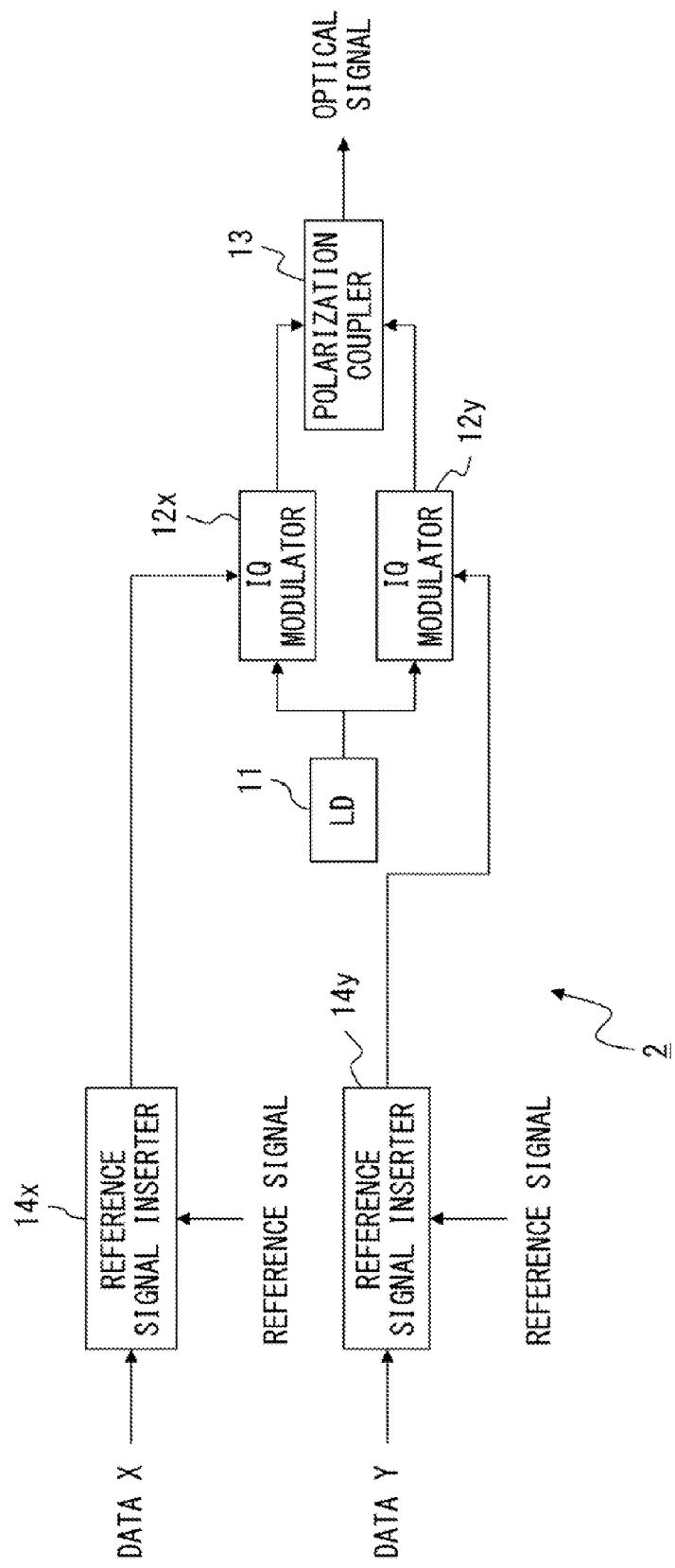
FIG. 3 illustrates the configuration of an optical transmitter.

FIG. 3 illustrates the configuration of the optical transmitter 2. Here, the optical transmitter 2 is supposed to generate polarization multiplexed optical signal. In the case in which the optical transmitter 2 transmits a WDM optical signal, the optical transmitter 2 has the configuration illustrated in FIG. 3 respectively for each wavelength.

The optical transmitter 2 has a light source (LD) 11, IQ modulators 12x, 12y and a polarization coupler (polarization beam combiner) 13. The light source 11 includes, for example, a laser diode, and generates continuous wave (CW) light of a specified wavelength. The CW light generated by the light source 11 is split by an optical splitter for example, and is input to the IQ modulators 12x and 12y.

IQ modulators 12x and 12y are respectively LN modulators including, for example, a Mach-Zehnder interferometer. The IQ modulator 12x generates an optical signal X that transmits data X by modulating the input light by a data signal X. Similarly, the IQ modulator 12y generates an optical signal Y that transmits data Y by modulating the input light by a data signal Y. The polarization coupler 13 generates a polarization multiplexed optical signal by combining the optical signal X generated by the IQ modulator 12x and the optical signal Y generated by the IQ modulator 12y.

The optical transmitter 2 has reference signal inserters 14x and 14y for inserting a reference signal to the optical signal. The reference signal inserters 14x inserts a reference signal of a specified bit pattern to the data X. Similarly, the reference signal inserters 14y inserts a reference signal of a specified bit pattern to the data Y. That is, to the data signals X and Y applied to the IQ modulators 12x and 12y, a reference signal is inserted respectively. Here, the reference signals inserted to the data signals X and Y may be the same as each other or may be different from each other.

FIG. 4 is a diagram illustrating the insertion of the reference signal. Here, it is assumed that the reference signal inserter 14x inserts a reference signal to the data X. In this example, the data X include data X1, data X2, . . . .

The reference signal inserter 14x inserts, while there is no particular limitation, in the time domain, the reference signal to the head of each data X1, data X2, . . . . In the example illustrated in FIG. 4, "0101" is inserted respectively to the head of the data X1, data X2, . . . .

Figure 5:
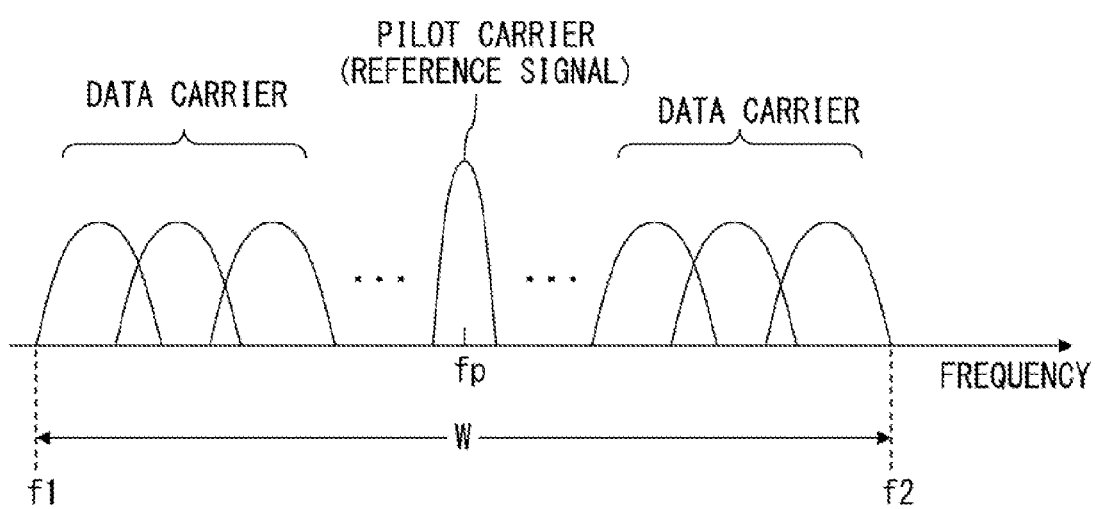
FIG. 5 illustrates the spectrum of an optical signal transmitted from the optical transmitter.

FIG. 5 illustrates the spectrum of the optical signal transmitted from the optical transmitter 2. The optical transmitter 2 transmits, in this example, an optical signal by FDM (Frequency Division Multiplexing). The optical transmitter 2 may transmit the optical signal by, for example, OFDM (Orthogonal Frequency Division Multiplexing) with a good frequency usage efficiency.

The optical transmitter 2 transmits data using a plurality of data carriers of different frequencies from each other, as illustrated in FIG. 5. For example, when the data X includes data X1, data X2, . . . , the optical transmitter 2 may assign the data X1, the data X2, . . . , to a data carrier 1, data carrier 2, . . . , respectively. In addition, the optical transmitter 2 assigns a pilot carrier to the reference signal. At this time, the optical transmitter 2 may make the power or the amplitude of the reference signal assigned to the pilot carrier larger compared with the data signal assigned to the data carrier.

The allocation of the pilot carrier is determined based on the bandwidth of the optical signal transmitted from the optical transmitter 2, and the maximum receiver bandwidth of the analog receiver circuit of the optical receiver 3. In this embodiment, it is assumed that the maximum receiver bandwidth of the analog receiver circuit is smaller than the bandwidth W of the optical signal and larger than W/2. In this case, it is preferable that the pilot carrier is allocated on the center (or approximately on the center) of the signal band of the optical signal. Meanwhile, the analog receiver circuit of the optical receiver 3 is to be explained later.

In FIG. 5, the signal band of the optical signal is extended from the frequency f1 of the data carrier with the lowest frequency to the frequency f2 of the data carrier with the highest frequency. That is, the bandwidth W of the optical signal is expressed as f2−f1. In this case, it is preferable that the frequency fp of the pilot carrier is "(f1+f2)/2" or around "(f1+f2)/2".

Thus, the optical transmitter 2 inserts a reference signal to the data signal, and transmits an optical signal to which the reference signal is inserted. At this time, the reference signal is transmitted using a pilot carrier allocated on the center (or approximately on the center) of the signal band of the optical signal.

Figure 6:
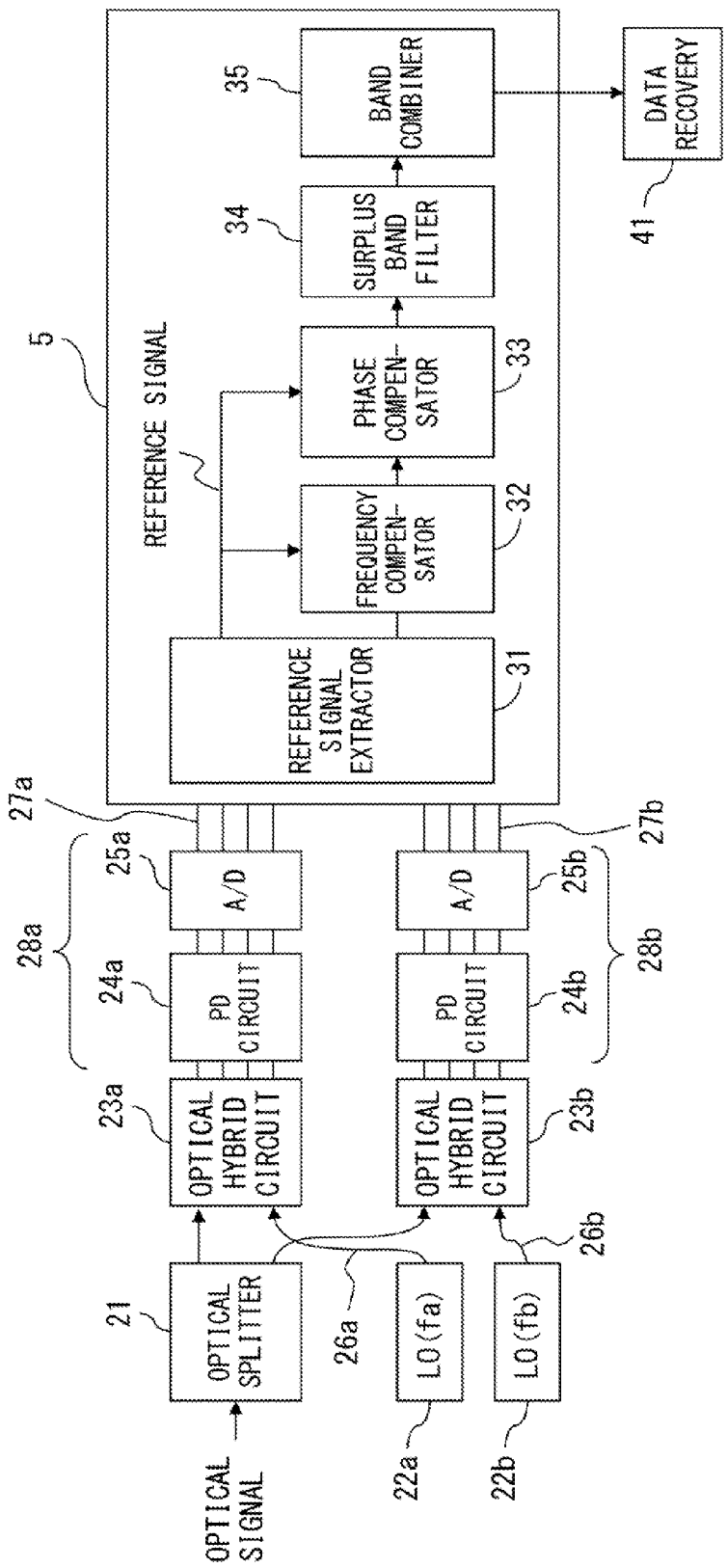
FIG. 6 illustrates the configuration of an optical receiver.

FIG. 6 illustrates the configuration of the optical receiver 3. The optical receiver 3 has an optical splitter 21, local oscillators 22a, 22b, optical hybrid circuits 23a, 23b, photo detector circuits 24a, 24b, A/D converters 25a, 25b, and the digital signal processor 5. The optical receiver 3 receives the optical signal transmitted from the optical transmitter 2. That is, the optical receiver 3 receives the optical signal to which the reference signal is inserted as described above.

The optical splitter 21 splits an input optical signal and guides to the optical hybrid circuits 23a and 23b. The optical splitter 21 splits the input optical signal equally to each other. Therefore, optical signals of approximately the same power as each other are input to the optical hybrid circuits 23a and 23b. The optical signals input to optical hybrid circuit 23a and 23b respectively include the reference signal.

The local oscillators (LOs) 22a, 22b are, for example, laser light sources. The LO 22a generates local oscillator light 26a. The local oscillator light 26a is CW light of frequency fa. The local oscillator light 26a is guided to the optical hybrid circuit 23a. Similarly, the LO 22b generates local oscillator light 26b. The local oscillator light 26b is CW light of frequency fb. The local oscillator light 26b is guided to the optical hybrid circuit 23n.

The frequency fa of the local oscillation light 26a may be determined so as to be approximately the intermediate value between the low end frequency f1 of the signal band and the frequency fp of the pilot carrier. That is, the LO 22a is designed so that fa is equal to or around (f1+fp)/2. Meanwhile, frequency fb of the local oscillation light 26b may be determined so as to be approximately the intermediate value between the high end frequency f2 of the signal band and the frequency fp of the pilot carrier. That is, the LO 22b is designed so that fb is equal to or around (f2+fp)/2.

To the optical hybrid circuit 23a, the optical signal and the local oscillation light 26a are input. The optical hybrid circuit 23a has a phase shifter that shifts the phase of the local oscillation light 26a by 90 degrees. The optical hybrid circuit 23a mixes the optical signal and the local oscillation light 26a, and mixes the optical signal and the 90-degree shifted local oscillation light 26a. Accordingly, the I component signal and the Q component signal of the optical signal that has been frequency converted with the frequency fa. Similarly, the optical hybrid circuit 23b outputs the I component signal and the Q component signal of the optical signal that has been frequency converted with the frequency fb. Thus, the front end circuit of the optical receiver 3 operates as a coherent receiver.

In the example illustrated in FIG. 6, the optical signal is a polarization multiplexed signal. Thus, the optical hybrid circuits 23a, 23b respectively output four signals (X polarization I component, X polarization Q component, Y polarization I component, Y polarization Q component). However, the optical signal may be a single polarization signal. In this case, the optical hybrid circuits 23a, 23b respectively output two signals (I component, Q component). In the explanation below, description is made with respect to one polarization.

The photo detector circuit 24a converts the I component signal and the Q component signal of the optical signal obtained by the optical hybrid circuit 23a respectively into an electric signal. The photo detector circuit 24a includes, for example, a photo diode. The A/D converter 25a converts the electric signals output from the photo detector 24a into digital signals 27a. That is, the A/D converter 25a outputs the digital signals 27a that represent the I component signal and the Q component signal of the optical signal that has been frequency converted with the frequency fa.

The operations of the photo detector circuit 24b and the A/D conversion circuit 25b are substantially the same as the photo detector circuit 24a and the A/D convertor 25a. That is, the photo detector circuit 24b converts the I component signal and the Q component signal of the optical signal obtained by the optical hybrid circuit 23b respectively into an electric signal. The A/D converter 25b outputs digital signals 27b that represent the I component signal and the Q component signal of the optical signal that has been frequency converted with the frequency fb.

Note that the optical hybrid circuit 23a, the photo detector 24a, the A/D converter 25a are an example of "a first generator to generate a first digital signal representing a signal component of a first partial band including the reference signal, from an optical signal to which a reference signal is inserted, using a first local oscillation light". In addition, the optical hybrid circuit 23b, the photo detector 24b, the A/D converter 25b are an example of "a second generator to generate a second digital signal representing a signal component of a second partial band including the reference signal, from an optical signal to which a reference signal is inserted, using a second local oscillation light".

As described above, the photo detectors 24a and 24b convert an input optical signal into an analog electric signal. In addition, the A/D converters 25a and 25b convert an analog electric signal into a digital signal. That is, the photo detectors 24a and 24b and the A/D converters 25a and 25b are analog devices. Therefore, hereinafter, the circuit including the photo detector circuit 24a and the A/D converter 25a may be referred to as an analog receiver circuit 28a, and the circuit including the photo detector circuit 24b and the A/D converter 25b may be referred to as an analog receiver circuit 28b.

Many analog devices have a slower processing speed compared with optical devices or digital devices. That is, the maximum receiver bandwidth of the analog receiver circuits 28a and 28b is narrower compared with that of optical devices and digital devices. For this reason, if the bandwidth of the optical signal is very board (for example, equal to or more than 100 GHz), the analog receiver circuits 28a and 28b may be unable to receive all the signal components of the optical signal.

In this example, as illustrated in FIG. 7, the maximum receiver bandwidth of the analog receiver circuits 28a and 28b is narrower than the bandwidth W of the optical signal. For this reason, when a signal component obtained by frequency conversion with the frequency fa is input to the analog receiver circuit 28a, the signal component higher than the frequency fa1 is substantially cut off. That is, the analog receiver circuit 28a outputs the signal component within the partial band 29a illustrated in FIG. 7. Similarly, when a signal component obtained by frequency conversion with the frequency fb is input to the analog receiver circuit 28b, the signal component lower than the frequency fb1 is substantially cut off. That is, the analog receiver circuit 28b outputs the signal component within the partial band 29b illustrated in FIG. 7.

Thus, the signal band of the optical signal is substantially divided into partial bands 29a and 29b. Note that the partial bands 29a and 29b have overlap frequency area. In FIG. 7, both of the partial bands 29a and 29b include frequency area fb1–fa1.

Figure 8A:
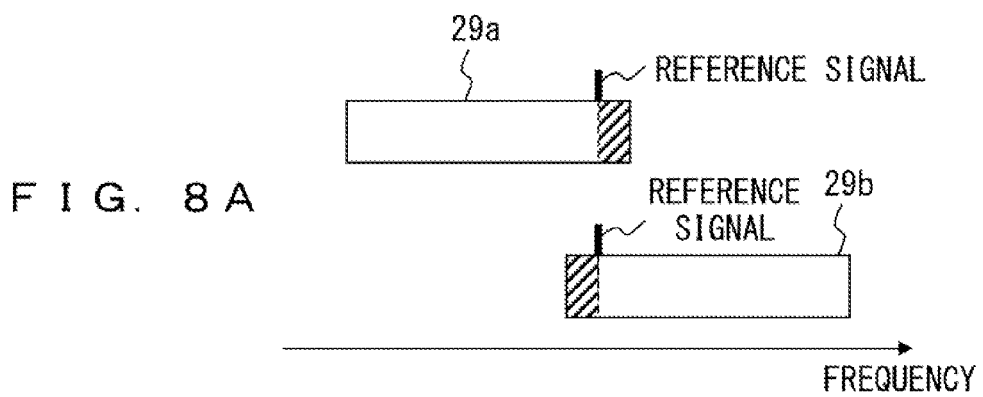
FIGS. 8A-8C are diagrams illustrating generation and combination of partial bands.

Here, in this example, it is assumed that the maximum receiver bandwidth of the analog receiver circuits 28a and 28b are respectively smaller than the bandwidth W of the optical signal and larger than W/2. Then, as illustrated in FIG. 8A, the signal component of the partial band 29a includes the reference signal, and the signal component of the partial band 29b also includes the reference signal. That is, the reference signal is included in both of the partial bands 29a and 29b.

The optical receiver 3 removes, for example, the higher side of the frequency of the reference signal (that is, the frequency fp of the pilot carrier) from the partial band 29a, and removes the lower side of the frequency of the reference signal from the partial band 29b. In FIG. 8A, the shaded areas are removed from the partial bands 29a and 29b, respectively. Then, the optical receiver 3 combines the partial bands 29a and 29b after the band removal process described above. Accordingly, all signal components within the signal band of the optical signal generated by the optical transmitter 2 are recovered. That is, the optical receiver 3 is able to recover transmission data from the signal components.

Figure 8B:
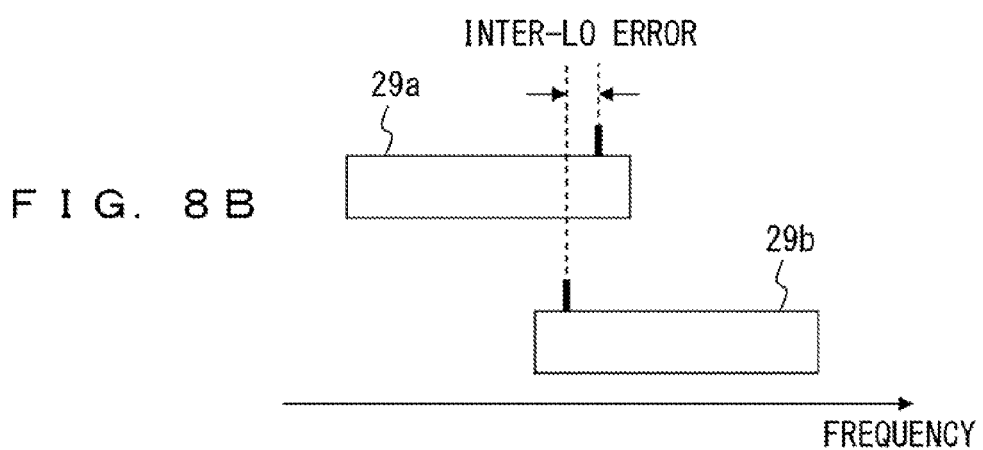

However, the oscillation frequencies fa and fb of the LOs 22a and 22b respectively may have errors. The errors of the oscillation frequencies fa and fb may be respectively about several GHz for example. When at least one of the oscillation frequencies fa and fb includes error, the optical receiver 3 may be unable to process the partial bands 29a and 29b in the same frequency domain, and may be unable to combine the partial bands 29a and 29b. For example, the frequency of the reference signal in the partial band 29a and the frequency of the reference signal in the partial band 29b are supposed to be the same. However, when the oscillation frequencies fa and fb have errors, as illustrated in FIG. 8B, the frequency of the reference signal in the partial band 29a and the frequency of the reference signal in the partial band 29b are represented to be different from each other. The inter-LO error illustrated in FIG. 8B represents the difference between the frequency of the reference signal in the partial band 29a and the frequency of the reference signal in the partial band 29b. Therefore, when the oscillation frequencies fa and fb have errors, the optical receiver 3 may be unable to combine the partial bands 29a and 29b, and may be unable to recover data from the received optical signal.

In addition, in the optical receiver 3 of the embodiment, the LOs 22a and 22b outputs the local oscillation lights 26a and 26b independently from each other without synchronization with each other. That is, the phases of the local oscillation lights 26a and 26b are not synchronized with each other. For this reason, when the partial band 29a obtained using the local oscillation light 26a and the partial band 29b obtained using the local oscillation light 26b are combined, even if the error of the oscillation frequencies fa and fb is zero, each symbol may not be recovered correctly. That is, if phase synchronization is not established between the local oscillation lights 26a and 26b, the bit error rate may deteriorate.

As described above, the optical receiver 3 divides the signal band of the optical signal into a plurality of partial bands (29a, 29b) in order to receive an optical signal of a broader bandwidth than the maximum receiver bandwidth of each analog receiver circuit (28a, 28b). Thus, the optical receiver 3 generates a digital signal representing the signal component for each partial band 29a and 29b. However, each of the oscillation frequencies of the local oscillators may have error, and the local oscillation lights 26a and 26b are not synchronized with each other. Therefore, the optical receiver 3 of the embodiment performs frequency compensation and phase compensation based on the common signal (that is, the reference signal included in both of the partial bands 29a and 29b) using digital signal processing. Hereinafter, the operation of the digital signal processor 5 that performs frequency compensation and phase compensation is explained.

The digital signal processor 5 has a reference signal extractor 31, a frequency compensator 32, a phase compensator 33, a surplus band filter 34, a band combiner 35. To the digital signal processor 5, the digital signals 27a, 27b generated by the A/D converters 25a, 25b are input. The digital signal 27a represents the signal component of the partial band 29a generated from the optical signal to which the reference signal is inserted using the local oscillation light 26a. The digital signal 27b represents the signal component of the partial band 29b generated from the optical signal to which the reference signal is inserted using the local oscillation light 26b.

The reference signal extractor 31 extracts the reference signal from the digital signals 27a, 27b, respectively. The reference signal extractor 31 converts the digital signals 27a, 27b into frequency domain signals using FFT (Fast Fourier Transform) for example. Then, the reference signal extractor 31 extracts the reference signal by extracting the pilot carrier in the frequency domain. In this example, the optical transmitter 2 may make the power of the pilot carrier than other carriers as illustrated in FIG. 5. In this case, the reference signal extractor 31 may extract the pilot carrier by detecting a larger carrier than a specified threshold level in the frequency domain.

The frequency compensator 32 performs digital operation processing to compensate for the inter-LO error illustrated in FIG. 8B. In this example, the frequency compensator 32 compensates for the frequency offset $\Delta fa$ of the signal component represented by the digital signal 27a, based on the reference signal extracted from the digital signal 27a. That is, the frequency compensator 32 compensates for the frequency offset $\Delta fa$ of the signal component of the partial band 29a. The frequency offset $\Delta fa$ corresponds to the difference between the frequency fa of the local oscillation light 26a and fp of the frequency of the pilot carrier. Similarly, the frequency compensator 32 compensates for the frequency offset $\Delta fb$ of the signal component represented by the digital signal 27b, based on the reference signal extracted from the digital signal 27b. That is, the frequency compensator 32 compensates for the frequency offset $\Delta fb$ of the signal component of the partial band 29b. The frequency offset $\Delta fb$ corresponds to the difference between the frequency fb of the local oscillation light 26b and fp of the frequency of the pilot carrier.

As described above, the frequency compensator 32 compensates for the frequency offset $\Delta fa$ of the partial band 29a using the reference signal, and compensates for the frequency offset $\Delta fb$ of the partial band 29b using the same reference signal. Therefore, both of the signal components of the partial bands 29a, 29b are represented with respect to the pilot carrier (that is, the reference signal).

To the phase compensator 33, the signal components of the partial bands 29a, 29b whose frequency offset has been compensated are input. The phase compensator 33 performs digital operation processing to compensate for the phase error of the local oscillation lights 26a and 26b.

In this example, the phase compensator 33 adjusts the phase of the signal component of the partial band 29a with respect to the reference signal extracted from the digital signal 27a. In addition, the phase compensator 33 adjusts the phase of the signal component of the partial band 29b with respect to the reference signal extracted from the digital signal 27b. Therefore, both of the phases of the signal components of the partial bands 29a, 29b are adjusted with respect to the pilot carrier (that is, the reference signal). That is, synchronization between the phases of the signal components of the partial bands 29a and 29b is established.

To the surplus band filter 34, the signal components of the partial bands 29a and 29b whose frequency and phase have been adjusted are input. The surplus band filter eliminates, in the frequency domain, the overlapped area of the partial bands 29a and 29b. At this time, the surplus band filter 34 removes, for example, the higher side of the frequency of the reference signal (that is, the frequency fp of the pilot carrier) from the partial band 29a, and removes the lower side of the frequency of the reference signal from the partial band 29b. The process to remove the higher side of the frequency of the reference signal from the partial band 29a is performed by, for example, a low-pass filter realized by a digital filter. The process to remove the lower side of the frequency of the reference signal from the partial band 29b is performed by, for example, a high-pass filter realized by a digital filter. Note that the surplus band filter 34 does not have to remove the frequency component respectively from both of the partial bands 29a, 29b. That is, the surplus band filter 34 removes the overlapped area from at least one of the partial bands 29a and 29b.

The band combiner 35 combines the partial bands 29a and 29b output from the surplus band filter 34. At this time, the band combiner 35 combines the partial bands 29a and 29b in the frequency domain. Accordingly, all signal components within the signal band of the optical signal generated by the optical transmitter 2 are recovered. That is, the data signals of all of the data carriers illustrated in FIG. 5 are recovered. At this time, the band combiner 35 may remove the reference signal. Then, the band combiner 35 transmits the data signal to the data recovery 41.

The data recovery 41 recovers data respectively from the data signals allocated to the respective data carriers. The data recovery 41 may be provided within the digital signal processor 5, or may be provided outside the digital signal processor 5.

As described above, the optical receiver 3 divides the signal band into a plurality of partial bands 29a, 29b and generates the digital signal that represents the signal component of each partial band 29a, 29b, in order to receive an optical signal of a broader bandwidth than the maximum receiver bandwidth of each analog receiver circuit 28a, 28b. In addition, the digital signal processor 5 adjusts the frequency and phase of the signal components of the partial bands 29a, 29b with respect to a common signal (that is, the reference signal) included in both of the partial bands 29a, 29b. That is, while the partial bands 29a, 29b are generated using the local oscillation lights 26a, 26b that are independent from each other, the frequency offset of each partial band 29a, 29b is compensated, and the phase error between the local oscillation lights is also compensated. Therefore, while the optical receiver 3 performs coherent reception using a plurality of local oscillation lights that are independent from each other, the substantially same signal components as in the case in which coherent reception is performed using a plurality of local oscillation lights that are synchronized with each other. Therefore, according to the configuration of the embodiment, an optical signal of a broader bandwidth than the maximum receiver bandwidth of the analog receiver circuit can be received without providing a complicated optical circuit (here, a synchronizing circuit for local oscillation lights).

Figure 9:
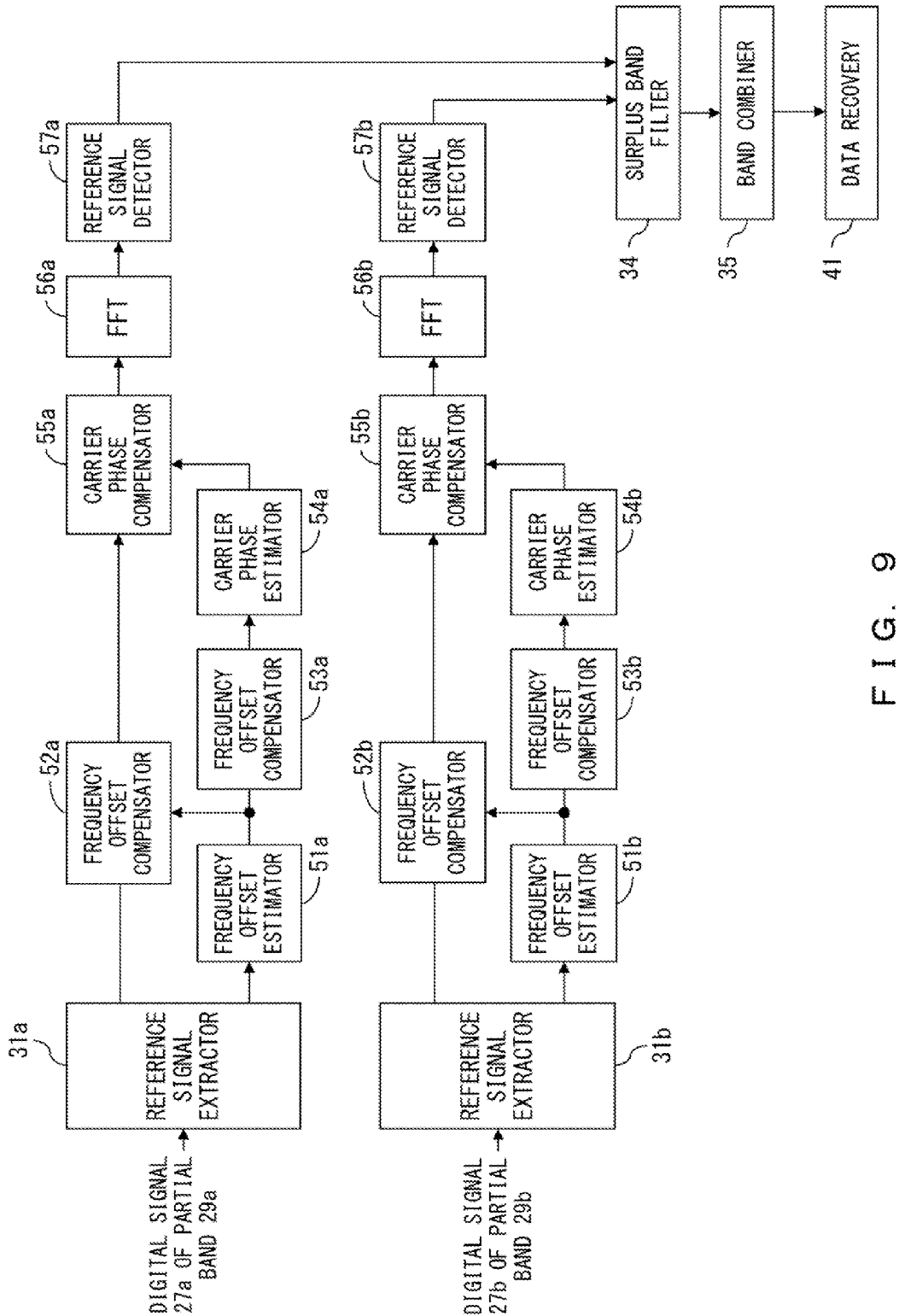
FIG. 9 illustrates an example of a digital signal processor.

FIG. 9 illustrates an example of the digital signal processor 5. To the digital signal processor 5, the digital signal 27a representing the signal component of the partial band 29a and the digital signal 27b representing the signal component of the partial band 29b are input. Note that the operations of the circuit that processes the digital signal 27a (a reference signal extractor 31a, a frequency offset estimator 51a, frequency offset compensators 52a, 53a, a carrier phase estimator 54a, a carrier phase compensator 55a, an FFT 56a, a reference signal detector 57a) and the circuit that processes the digital signal 27b (a reference signal extractor 31b, a frequency offset estimator 51b, frequency offset compensators 52b, 53b, a carrier phase estimator 54b, a carrier phase compensator 55b, an FFT 56b, a reference signal detector 57b) are substantially the same. Therefore, hereinafter, the circuit that processes the digital signal 27a is explained.

The reference signal extractor 31 guides the input digital signal 27a to the offset compensator 52a, and extracts the reference signal from the input digital signal 27a and guides the reference signal to the frequency offset estimator 51a. That is, the reference signal (the pilot carrier signal) extracted from the partial band 29a is given to the frequency offset estimator 51a. In addition, all signal components (the data carrier signals and the pilot carrier signal) within the partial band 29 are given to the frequency offset estimator 52a.

The frequency offset estimator 51a estimates the frequency offset of the signal component of the partial band 29a with respect to the local oscillation light 26a using the reference signal. That is, the frequency offset estimator 51a estimates the frequency offset Δfa between the frequency fp of the pilot carrier and the frequency fa of the local oscillation light 26a.

Figure 10:
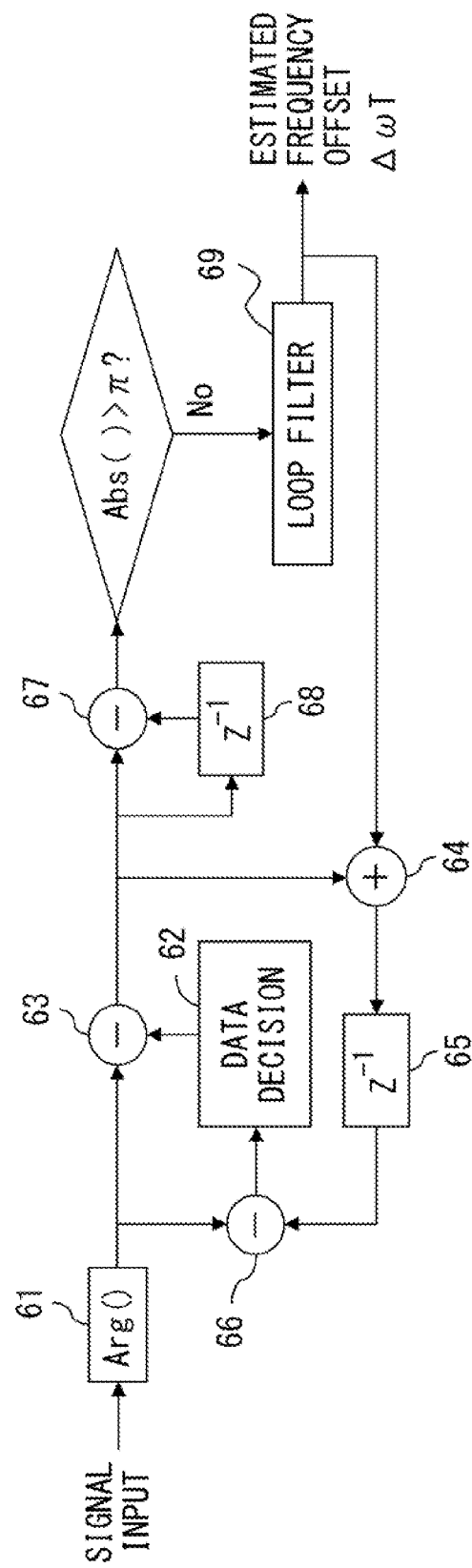
FIG. 10 illustrates an example of a frequency offset estimator.

FIG. 10 illustrates an example of the frequency offset estimator 51a. In FIG. 10, an argument calculator 61 calculates an argument of a target symbol based on the I component (that is, the real number component) and the Q component (that is, the imaginary number component) of the input signal (that is, the reference signal). The data decision unit 62 roughly decides the data modulation value of the target symbol based on the frequency offset ΔωT estimated for the immediately previous symbol of the target symbol. The subtracter 63 outputs error data by subtracting the data modulation value obtained by the data decision unit 62 from the argument value obtained by the argument calculator 61.

An adder 64 adds the estimated frequency offset ΔωT to the error data obtained by the subtracter 63. A delay element 65 delays the output of the adder 64 by one symbol time period. The subtracter 66 subtracts the output data of the adder 65 from the argument obtained from the argument calculator 61 and gives the result to the data decision unit 62.

A subtracter 67 and a delay element 68 calculate the difference between error data between successive symbols. The difference between the error data corresponds to the frequency offset ΔωT to which noise is added. Therefore, the frequency offset estimator illustrated in FIG. 10 removes or suppresses the noise using a loop filter 69. As a result, the estimated value of the frequency offset ΔωT is obtained. However, since the frequency offset estimator illustrated in FIG. 10 does not use the mth power algorithm to eliminate the influence of data modulation, a procedure to decide ambiguity is performed for the difference between the error data. In the example illustrated in FIG. 10, when the absolute value of the difference between error data is equal to or smaller than π, the difference between the error data is sent to the loop filter 69.

The frequency offset Δfa (ΔωT in FIG. 10) estimated by the frequency offset estimator 51a is given to the frequency offset compensator 52a. The frequency offset compensator 52a compensates for the frequency offset of the signal component of the partial band 29a using the frequency offset. Note that the frequency offset Δfa indicates a difference between the frequency fp of the pilot carrier and the frequency fa of the local oscillation light 26a.

Figure 11:
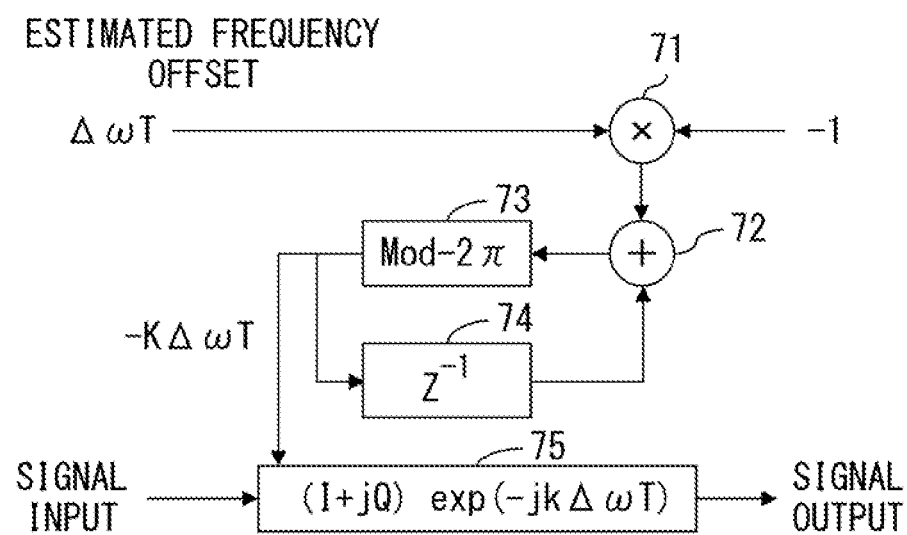
FIG. 11 illustrates an example of a frequency offset compensator.

FIG. 11 illustrates an example of the frequency offset compensator 52a. In this example, the frequency offset compensator 52a is realized by a phase rotator. That is, a multiplier 71 multiplies the frequency offset ΔωT by "−1". That is, "−ΔωT" is generated. An adder 72, a modulo 2π operator 73, and a delay element 74 adds "−ΔωT" cumulatively for each symbol and obtains "−kΔωT", where "k" represents the sequence number of the input symbol. The rotator 75 rotates the phase of the input signal by giving "exp(−jkΔωT)" to the input signal. When the phase of the input signal is rotated as described above, a signal whose frequency is adjusted according to the rotation amount is output.

As described above, the frequency offset compensator 52a compensates for the frequency offset of the signal component of the partial band 29a. That is, the frequency offset compensator 52a adjusts the frequency of the signal component of the partial band 29a using the frequency offset obtained based on the reference signal. Meanwhile, the frequency offset estimator 51a and the frequency offset compensator 52a are an example of the frequency compensator 32 illustrated in FIG. 6. In addition, the estimation and compensation of the frequency offset is described in the document below for example.

Wide-range, Accurate and Simple Digital Frequency Offset Compensator for Optical Coherent Receiver, Lei Li et al., OFC 2008, OWT4, 2008

The frequency offset compensator 53a compensates for the frequency offset of the reference signal using the frequency offset obtained based on the reference signal. The operation of the frequency offset compensator 53a is substantially the same as the frequency offset compensator 52a.

To the carrier phase estimator 54a, the reference signal whose frequency offset is compensated by the frequency offset compensator 53a is input. The carrier phase estimator 54a estimates the phase of the pilot carrier using the reference signal.

FIG. 12 illustrates an example of the carrier phase estimator 54. In this example, it is assumed that the reference signal whose frequency offset is compensated by the frequency offset compensator 53a is expressed by the following equation. The modulation method is assumed to be QPSK.

$$I'+jQ'=E\exp[j(\theta_e+\theta_s(t))]$$

$\theta_e$: phase error due to laser phase noise and the like
$\theta_s$: signal phase ($\pi/4$, $3\pi/4$, $5\pi/4$, $7\pi/4$)

An argument calculator 81 calculates an argument of the input signal. The argument of the input signal is expressed as $\theta_e+\theta_s$. A 4th power calculator 82 calculates the 4th power of the input signal, and multiplies the calculation result by "$-1$", which is realized by "$\exp(j\pi)$". A summation calculator 83 obtains the sum of the calculation results of the 4th power calculator 82 for N symbols, where N is a block size for averaging calculation and is determined, for example, depending on ASE noise and phase noise of the light source that generates the local oscillation light. An argument calculator 84 calculates an argument of the output signal of the summation calculator 83. A divider 85 divides the argument obtained by the argument calculator 84 by "4". Accordingly, the phase error $\theta_e$ is obtained. Then, a $\pi/2$ phase rotation tracker 86 performs $\pi/2$ phase rotation tracking for the phase error $\theta_e$ and obtains phase error $\theta_e'$.

A subtracter 87 subtracts the phase error $\theta_e'$ obtained by the $\pi/2$ phase rotation tracker 86 from the argument $\theta_e+\theta_s$ obtained by the argument calculator 81. Accordingly, a signal phase from which phase noise is removed is obtained. Further, a modulo operator 88 performs modulo ($,2\pi$) operation for the signal phase obtained by the subtracter 87, and obtains estimated value of the phase of the input signal. The phase of the pilot carrier is estimated as described above.

To the carrier phase compensator 55a, the signal component of the partial band 29a whose frequency offset has been compensated by the frequency offset compensator 52a is input. In addition, the signal phase of the pilot carrier estimated by the carrier phase estimator 54a is given to the carrier phase compensator 55a. The carrier phase compensator 55a compensates for the phase of the signal component of the partial band 29a using the signal phase of the pilot carrier.

The frequency offset compensator 53a, the carrier phase estimator 54a, the carrier phase compensator 55a are an example of the phase compensator 33 illustrated in FIG. 6. Note that the estimation and compensation of the carrier signal is described in the document below for example.

Nonlinear Estimation of PSK-Modulated Carrier Phase with Application to Burst Digital Transmission, Andrew J. Viterbi et al., IEEE Transactions on Information Theory, Vol. IT-29, No. 4, pp 543-551, July 1983

An FFT calculator 56a performs FFT for the signal whose frequency offset and carrier phase has been compensated as described above, and generates a frequency domain signal for the partial band 29a. That is, the time domain signal of the partial band 29a is converted into a frequency domain signal by the FFT calculator 56a. The reference signal detector 57a detects the reference signal from the frequency domain signal of the partial band 29a obtained by the FFT calculator 56a.

Thus, when the digital signal 27a representing the signal component of the partial band 29a is input, the digital signal processor 5 compensates for the frequency offset and the carrier phase of the signal component, based on the reference signal. In addition, the digital signal processor 5 performs similar compensation processes for the digital signal 27b representing the signal component of the partial band 29b. In other words, the frequency of the signal components of the partial bands 29a and 29b are adjusted using the same signal (that is, the reference signal). In addition, the phase of the signal components of the partial bands 29a and 29b are also adjusted using the same signal (that is, the reference signal). As a result, the signal components of the partial bands 29a and 29b whose frequency offset and carrier phase have been compensated based on the common reference (that is, the reference signal) are obtained.

The operations of the surplus band filter 34, the band combiner 35, the data recovery 41 are as described with reference to FIG. 6. That is, the surplus band filter 34 generates partial bands 29a', 29b' illustrated in FIG. 8C by removing surplus bands from the partial bands 29a, 29b using the reference signal detected by the reference signal detectors 57a, 57b. In addition, the band combiner 35 combines the partial bands 29a', 29b' generated by the surplus band filter 34 in the frequency domain.

In the optical receiver 3 of the embodiment, the local oscillation lights 26a, 26b are generated independently from each other. That is, the partial bands 29a, 29b are obtained using the local oscillation lights 26a, 26b that are independent from each other. For this reason, as illustrated in FIG. 8B, the partial bands 29a, 29b has the inter-LO error.

The digital signal processor 5 performs frequency offset compensation for the partial bands 29a, 29b, respectively, with respect to the reference signal. As a result, the frequencies of the signal components of the partial bands 29a, 29b are adjusted so that the frequency of the reference signal in the partial band 29a is to be equal to the frequency of the reference signal in the partial band 29b, as illustrated in FIG. 8A. Further, the digital signal processor 5 compensates for the carrier phase of the partial bands 29a, 29b respectively with respect to the reference signal. Therefore, the phases of the partial bands 29a, 29b synchronize with each other.

Figure 8C:
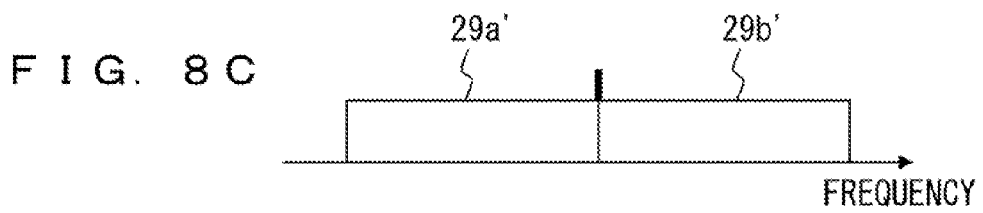

After the compensation process described above, the surplus band filter 34 removes the higher side of the frequency of the reference signal (that is, the frequency fp of the pilot carrier) from the partial band 29a, and removes the lower side of the frequency of the reference signal from the partial band 29b. In FIG. 8A, the shaded areas are removed from the partial bands 29a, 29b respectively. In other words, the surplus band filter 34 removes an overlap frequency area of the first and second partial bands 29a, 29b from at least one of the frequency adjusted first and second partial bands 29a, 29b. As a result, the partial bands 29a' and 29b' are generated. Then, the band combiner 35 combines the partial bands 29a' and 29b' in the frequency domain, as illustrated in FIG. 8C.

Accordingly, all signal components within the signal band of the optical signal generated by the optical transmitter 2 are recovered. Therefore, the data recovery 41 can recover the data transmitted by the optical signal.

As described above, in the optical system 1 of the embodiment, a reference signal is inserted to the transmission signal in the optical transmitter 2. The optical receiver 3 divides the signal band of the optical signal in such a way that each of the partial bands includes the reference signal. The optical receiver 3 adjusts the frequency and phase of each of the partial bands based on the frequency and phase of the reference signal included in each partial band by digital signal processing. That is, the function to establish synchronization between a plurality of local oscillators to receive a plurality of partial bands is realized by digital signal processing. Therefore, according to the configuration of the embodiment, an optical signal of a broad bandwidth that exceeds the maximum receiver bandwidth of the analog signal can be received without increasing the size of the optical receiver. In other words, according to the configuration of the embodiment, the size of the optical receiver to receive an optical signal of a broad bandwidth that exceeds the maximum receiver bandwidth of the analog signal may be reduced.

Other Embodiments

Figure 13:
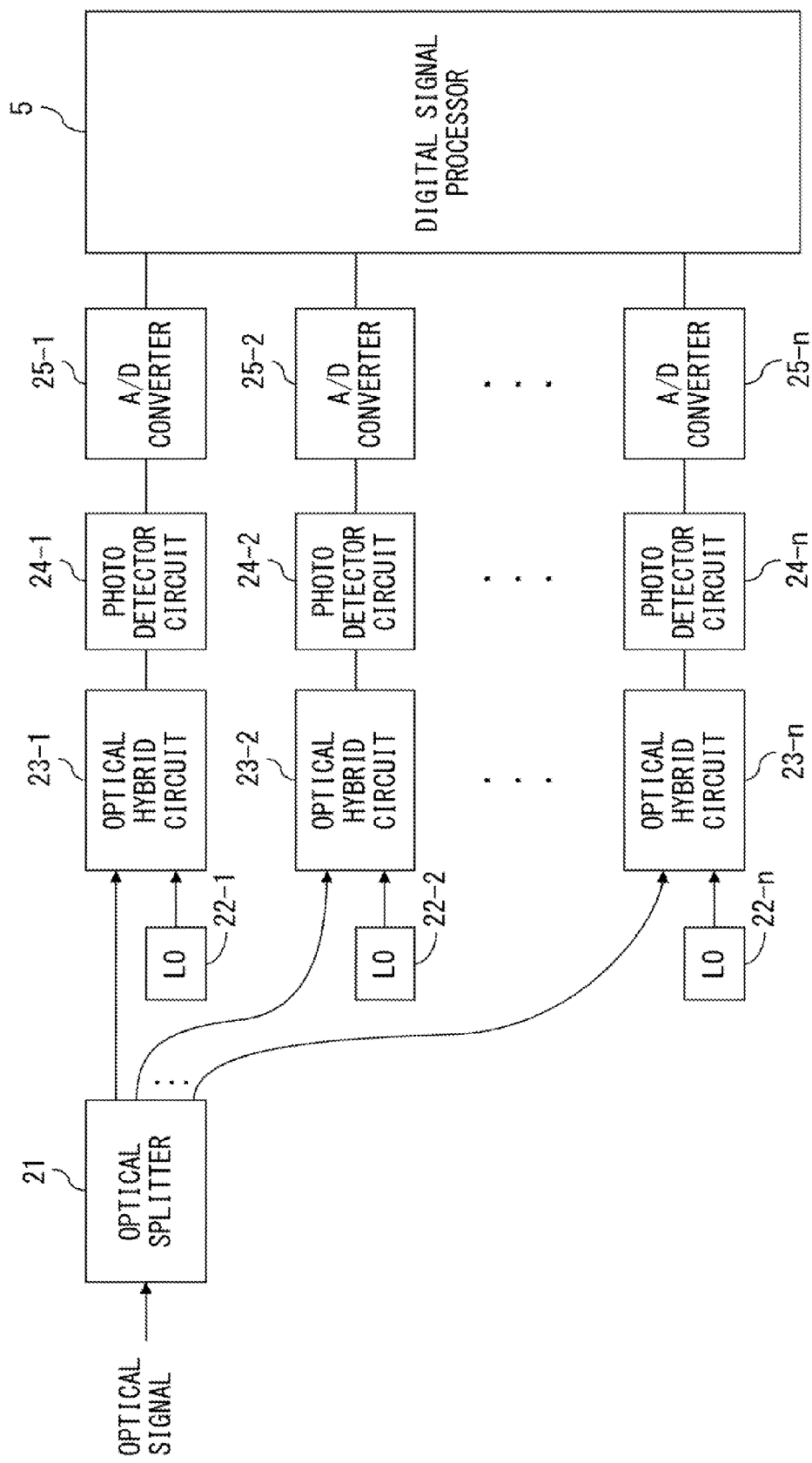
FIG. 13 illustrates the configuration of an optical receiver that processes the signal band while dividing into three or more partial bands.

While the optical receiver 3 divides the signal band of the optical signal into two partial bands in the embodiment illustrated in FIG. 6 through FIG. 9, the present invention is not limited to this configuration. The optical receiver 3 may divide the signal band of the optical signal into three or more partial bands. In the example illustrated in FIG. 13, the signal band of the optical signal is processed after being divided into n partial bands, where n is an integer equal to or larger than 3. In this case, the optical splitter 21 divides the input optical signal into n optical signals and guides the optical signals to optical hybrid circuits 21-1 through 23-*n*. To the optical hybrid circuits 21-1 through 23-*n*, local oscillation lights generated by LOs 22-1 through 22-*n* are input respectively. The output lights of the optical hybrid circuits 21-1 through 23-*n* are converted into electric signals by photo detector circuits 24-1 through 24-*n*, converted into digital signals by A/D converters 25-1 through 25-*n*, and given to the digital signal processor 5. That is, the digital signal processor 5 receives signal components of n partial bands.

When the signal band of the optical signal is divided into n partial bands in the optical receiver 3, the optical transmitter 2 inserts n−1 reference signals to the transmission signal. For example, if the signal band is divided into three partial bands in the optical receiver, the optical transmitter 2 inserts two reference signals (reference signals 1, 2) into the transmission signal as illustrated in FIG. 14A.

Figure 14A:
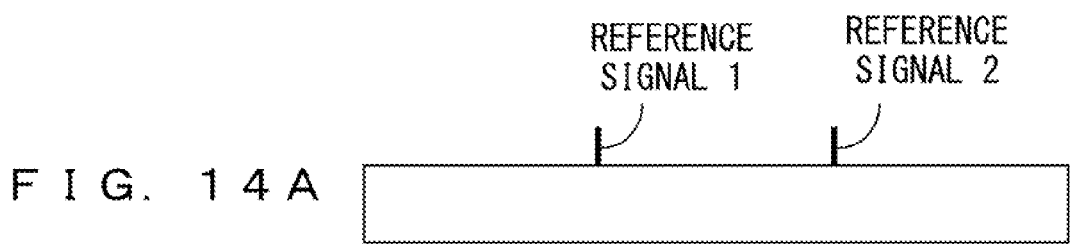
FIGS. 14A-14D are diagrams illustrating the procedure to combine three or more partial bands.
Figure 14B:
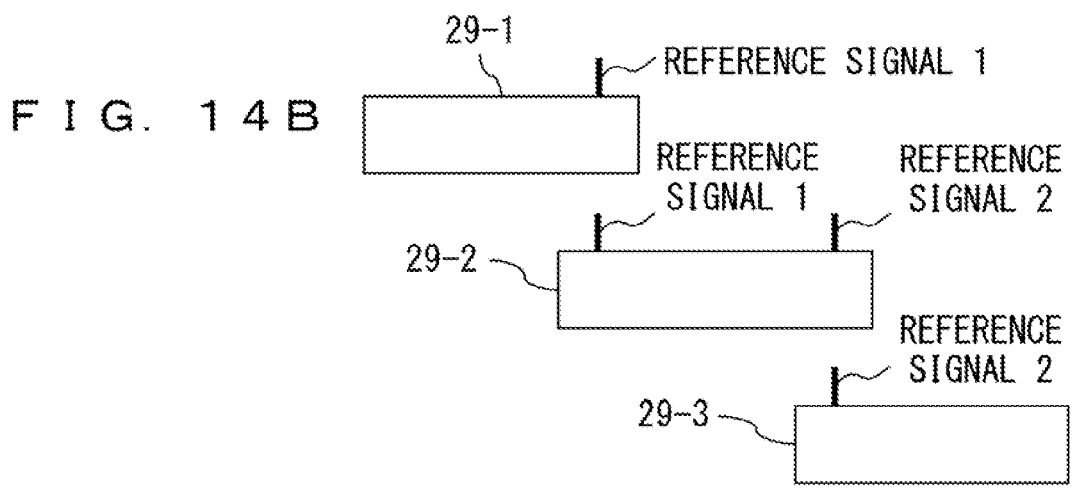

Upon receiving the optical signal illustrated in FIG. 14A, the optical receiver divides the signal band of the optical signal into three partial bands 29-1 through 29-3, as illustrated in FIG. 14B. At this time, the reference signal 1 is included in both of the partial bands 29-1 and 29-2, and the reference signal 2 is included in both of the partial bands 29-2 and 29-3. The digital signal processor 5 receives digital signals representing the partial bands 29-1 through 29-3.

Figure 14C:
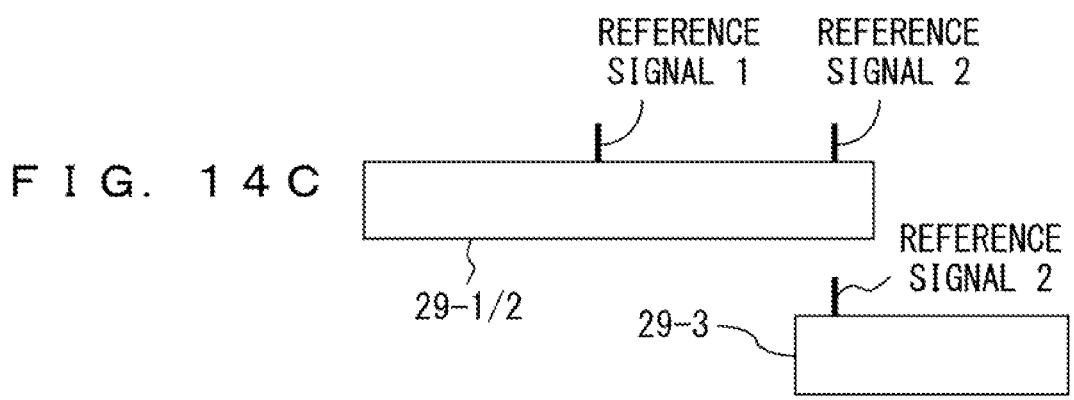
Figure 14D:
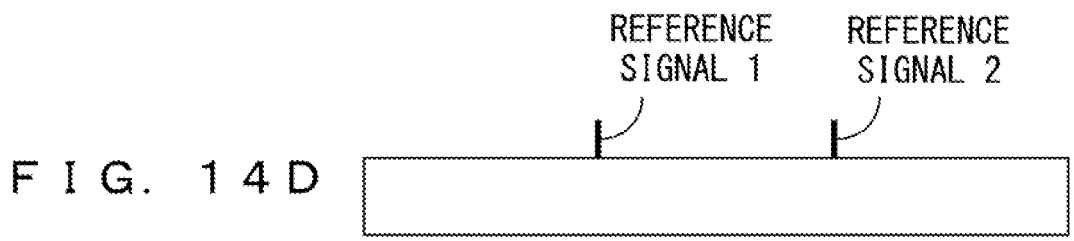

The digital signal processor 5 combines the partial bands 29-1 through 29-3, for example, after performing compensation for the partial bands 29-1 through 29-3 in the following procedure. That is, the digital signal processor 5 performs the compensation processing for the partial bands 29-1 and 29-2 using the reference signal 1. The compensation processing may be realized by a method described in FIG. 9 through FIG. 13. Then, the digital signal processor 5 combines the partial bands 29-1 and 29-2 after compensation. Accordingly, the partial band 29-1/2 illustrated in FIG. 14C is generated. Next, the digital signal processor 5 performs the compensation processing for the partial bands 29-1/2 and 29-3 using the reference signal 2. Then, the digital signal processor 5 combines the partial bands 29-1/2 and 29-3 after compensation. As a result, as illustrated in FIG. 14D, all signal components of the optical signal generated in the optical transmitter 2 are recovered.

Note that, when the optical transmitter 2 inserts a plurality of reference signals to the transmission signal, the spacing of the frequencies of the reference signals may be irregular. According to this configuration, interference between reference signals is suppressed. In addition, when the optical transmitter 2 inserts a plurality of reference signals to the transmission signal, the reference signals may be modulated with different low frequency signals. According to this configuration, interference between reference signals is suppressed as well.

While an example of the digital signal processing of the digital signal processor 5 is illustrated in FIG. 6 and FIG. 9, the present invention is not limited to this procedure. For example, the digital signal processor 5 may perform the filtering process to remove surplus bands before the process to estimate and compensate the carrier phase.

In the configuration in FIG. 6, when the output signals of the optical hybrid circuits 23*a*, 23*b* passes through the analog receiver circuits (the photo detector circuit and the A/D convertors) 28*a* and 28*b*, a part of the signal band is cut off respectively. That is, the analog receiver circuits 28*a* and 28*b* play the role as a band filter. However, the present invention is not limited to this configuration. That is, the optical receiver 3 may include a band filter for obtaining each partial band from the signal band of the optical signal. In this case, for example, a band filter for extracting the partial band 29*a* may be provided between the optical hybrid circuit 23*a* and the analog receiver circuit 28*a*, and a band filter for extracting the partial band 29*b* may be provided between the optical hybrid circuit 23*b* and the analog receiver circuit 28*b*.

Furthermore, while a coherent receiver is provided in the front end of the optical receiver 3 in the configuration illustrated in FIG. 6, the present invention is not limited to this configuration. For example, the optical receiver 3 may include a front end circuit that uses delay interference detection in place of the coherent receiver.

Furthermore, in the optical transmission system of the embodiment, the optical transmitter 2 inserts a reference signal to the transmission signal, and the optical receiver 3 recovers data using the reference signal. However, the present invention is not limited to this configuration. That is, a plurality of partial bands obtained in the optical receiver 3 share a part of signal components. For example, the signal components within the frequency range fa1–fb1 are shared by the partial bands 29*a*, 29*b* in the example illustrated in FIG. 7. Here, the signal components shared by the partial bands have strong correlation. Therefore, the optical receiver 3 may calculate correlation between partial bands, and may perform frequency offset compensation and carrier phase compensation based on the signal component of the frequency range with high correlation. In this case, the signal component of the frequency range with high correlation is used as a pseudo reference signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. An optical receiver receiving an optical signal including a reference signal, the receiver comprising:
    a first generator to generate, from the optical signal, a first digital signal representing a signal component of a first frequency band including the reference signal, using a first local oscillation light of a first frequency;
    a second generator to generate, from the optical signal, a second digital signal representing a signal component of a second frequency band including the reference signal, using a second local oscillation light of a second frequency being different from the first frequency;
    a frequency compensator to adjust a frequency of the signal component of the first frequency band and a frequency of the signal component of the second frequency band according to a frequency of the reference signal; and
    a combiner to combine the first and second frequency bands adjusted by the frequency compensator.

2. The optical receiver according to claim 1, wherein
    the frequency compensator compensates for a frequency offset between the first frequency and the frequency of the reference signal to adjust the frequency of the signal component of the first frequency band, and compensates for a frequency offset between the second frequency and the frequency of the reference signal to adjust the frequency of the signal component of the second frequency band.

3. The optical receiver according to claim 1, further comprising:
    a phase compensator to adjust a phase of the signal component of the first frequency band according to a phase of the reference signal using the first digital signal, and to adjust a phase of the signal component of the second frequency band according to the phase of the reference signal using the second digital signal, wherein
    the combiner combines the first and second frequency bands whose frequency has been adjusted by the frequency compensator and whose phase has been adjusted by the phase compensator.

4. The optical receiver according to claim 1, further comprising:
    a band filter to remove an overlap frequency area of the first and second frequency bands from at least one of the first and second frequency bands adjusted by the frequency compensator.

5. The optical receiver according to claim 1, further comprising:
    a data recovery to recover transmission data from a signal component of a signal band obtained by the combiner.

6. A method for receiving an optical signal including a reference signal, comprising:
    generating, from the optical signal, a first digital signal representing a signal component of a first frequency band including the reference signal, using a first local oscillation light of a first frequency;
    generating, from the optical signal, a second digital signal representing a signal component of a second frequency band including the reference signal, using a second local oscillation light having a frequency that is difference from the first local oscillation light of a second frequency being different from the first frequency;
    adjusting a frequency of the signal component of the first frequency band and a frequency of the signal component of the second frequency band according to a frequency of the reference signal; and
    combining the frequency adjusted first and second frequency bands.

7. An optical transmission system comprising an optical transmitter and an optical receiver to receive an optical signal transmitted from the optical transmitter, wherein
    the optical transmitter comprises:
        a reference signal inserter to insert a reference signal to a transmission signal; and
        a modulator to generate an optical signal from the transmission signal to which the reference signal is inserted; and
    the optical receiver comprises:
        a first generator to generate a first digital signal representing a signal component of a first frequency band including the reference signal from the optical signal, using a first local oscillation light of a first frequency;
        a second generator to generate a second digital signal representing a signal component of a second frequency band including the reference signal from the optical signal, using a second local oscillation light of a second frequency being different from the first frequency;
        a frequency compensator to adjust a frequency of the signal component of the first frequency band and a frequency of the signal component of the second frequency band according to a frequency of the reference signal; and
        a combiner to combine the first and second frequency bands adjusted by the frequency compensator.

8. An optical receiver receiving an optical signal including a reference signal, the receiver comprising:
    a first generator to generate, from the optical signal, a first digital signal representing a signal component of a first frequency band including the reference signal, using a first local oscillation light of a first frequency;
    a second generator to generate, from the optical signal, a second digital signal representing a signal component of a second frequency band including the reference signal, using a second local oscillation light of a second frequency being different from the first frequency; and
    a processor to process the first and second digital signals, wherein the processor adjusts a frequency of the signal component of the first frequency band and a frequency of the signal component of the second frequency band according to a frequency of the reference signal, and
    the processor combines the frequency adjusted first and second frequency bands.

9. The optical receiver according to claim 8, wherein
    the processor compensates for a frequency offset between the first frequency and the frequency of the reference signal to adjust the frequency of the signal component of the first frequency band, and compensates for a frequency offset between the second frequency and the frequency of the reference signal to adjust the frequency of the signal component of the second frequency band.

10. The optical receiver according to claim 8, wherein
    the processor adjusts a phase of the signal component of the first frequency band according to a phase of the reference signal using the first digital signal, and to adjusts a phase of the signal component of the second frequency band according to the phase of the reference signal using the second digital signal, the processor combines the frequency and phase adjusted first and second frequency bands.

11. The optical receiver according to claim 8, wherein the processor removes an overlap frequency area of the first and second frequency bands from at least one of the frequency adjusted first and second frequency bands.

12. The optical receiver according to claim 8, further comprising: a data recovery to recover transmission data from a signal component of a signal band obtained by combining the frequency adjusted first and second frequency bands.

13. An optical receiver receiving an optical signal including a reference signal, the receiver comprising:
   a first generator to generate, from the optical signal, a first digital signal representing a signal component of a first frequency band including the reference signal, using a first local oscillation light of a first frequency;
   a second generator to generate, from the optical signal, a second digital signal representing a signal component of a second frequency band including the reference signal, using a second local oscillation light of a second frequency being different from the first frequency;
   a processor that is operative to adjust a frequency of the signal component of the first f frequency band and a frequency of the signal component of the second frequency band according to a frequency of the reference signal, and to combine the first and second adjusted frequency bands.

14. The optical receiver according to claim 13, wherein
   the processor compensates for a frequency offset between the first frequency and the frequency of the reference signal to adjust the signal component of the first frequency band, and compensates for a frequency offset between the second frequency and the frequency of the reference signal to adjust the signal component of the second frequency band.

15. The optical receiver according to claim 13, wherein
   the processor adjusts a phase of the signal component of the first frequency band according to a phase of the reference signal using the first digital signal, and adjusts a phase of the signal component of the second frequency band according to the phase of the reference signal using the second digital signal, and the combiner combines the first and second frequency bands whose frequency and phase has been adjusted.

16. The optical receiver according to claim 13, further comprising:
   a band filter to remove an overlap frequency area of the first and second frequency bands from at least one of the first and second adjusted frequency bands.

17. The optical receiver according to claim 13, further comprising:
   a data recovery to recover transmission data from a signal component of a combined signal band.

18. An optical transmission system comprising an optical transmitter and an optical receiver to receive an optical signal transmitted from the optical transmitter, wherein
   the optical transmitter comprises:
      a reference signal inserter to insert a reference signal to a transmission signal; and
      a modulator to generate an optical signal from the transmission signal to which the reference signal is inserted; and
   the optical receiver comprises:
      a first generator to generate a first digital signal representing a signal component of a first frequency band including the reference signal from the optical signal, using a first local oscillation light of a first frequency;
      a second generator to generate a second digital signal representing a signal component of a second frequency band including the reference signal from the optical signal, using a second local oscillation light of a second frequency being different from the first frequency;
      a processor that is operative to adjust a frequency of the signal component of the first frequency band and a frequency of the signal component of the second frequency band according to a frequency of the reference signal, and to combine the first and second adjusted frequency bands.

* * * * *